(12) United States Patent
Lindskov et al.

(10) Patent No.: US 8,899,180 B2
(45) Date of Patent: Dec. 2, 2014

(54) TRAY FOR PRESENTING FOOD TO A PET

(75) Inventors: Frederik Estrup Lindskov, Tikøb (DK); Mikkel Hansen, København V (DK)

(73) Assignee: Jørgen Kruuse A/S, Langeskov (DK)

( * ) Notice: Subject to any disclaimer, the term of this patent is extended or adjusted under 35 U.S.C. 154(b) by 0 days.

(21) Appl. No.: 13/982,210

(22) PCT Filed: Jan. 28, 2011

(86) PCT No.: PCT/EP2011/051235
§ 371 (c)(1),
(2), (4) Date: Aug. 3, 2013

(87) PCT Pub. No.: WO2012/100834
PCT Pub. Date: Aug. 2, 2012

(65) Prior Publication Data
US 2013/0305996 A1 Nov. 21, 2013

(51) Int. Cl.
*A01K 1/10* (2006.01)
*A01K 5/01* (2006.01)

(52) U.S. Cl.
CPC ................................. *A01K 5/0114* (2013.01)
USPC ........................................................ 119/61.1

(58) Field of Classification Search
CPC .............................. A01K 5/01; A01K 5/0114
USPC ............ 119/51.01, 51.03, 51.12, 51.13, 52.4, 119/58, 61.5, 61.1, 61.54, 61.55, 63, 416, 119/417, 421, 702, 707, 709, 710, 711; 99/442, 444, 445, 428, 354; D30/130; 463/15; 472/62; D21/340; 220/574–575
See application file for complete search history.

(56) References Cited

U.S. PATENT DOCUMENTS

| | | | | |
|---|---|---|---|---|
| 3,205,860 A | * | 9/1965 | Moore | 119/52.4 |
| 3,260,236 A | | 7/1966 | Jones | |
| 3,374,982 A | * | 3/1968 | Sallade | 249/121 |
| 3,670,523 A | * | 6/1972 | Fogt et al. | 62/344 |
| D229,074 S | * | 11/1973 | Cuprak | D30/130 |
| 3,829,088 A | * | 8/1974 | Pahlas | 273/443 |
| 4,841,911 A | | 6/1989 | Houghton | |
| D326,743 S | * | 6/1992 | Haynes | D30/130 |
| D347,303 S | * | 5/1994 | Mann | D30/130 |
| 5,397,097 A | * | 3/1995 | Dale | 249/121 |

(Continued)

FOREIGN PATENT DOCUMENTS

| | | |
|---|---|---|
| GB | 2311454 | 10/1997 |
| WO | WO 2011032285 A1 | 3/2011 |

OTHER PUBLICATIONS

International Search Report and Written Opinion, PCT/EP2011/051235, mailed Nov. 4, 2011.

*Primary Examiner* — Isam Alsomiri
*Assistant Examiner* — Ebony Evans
(74) *Attorney, Agent, or Firm* — Winston & Strawn LLP

(57) ABSTRACT

A tray for presenting food to a pet or animal. The tray includes a top side, an underside and a peripheral side extending between the top side and the underside. The topside is moreover partly formed as a number of up-turned grooves and interconnected grooves. When a pet is retrieving food from the tray, the animal will not only be self-engaged and fed during retrieval of the food, but the tray will also ensure that the natural needs of the animal are meet with respect to the use of brain, olfactory sense and feeding. The animal will hereby be more relaxed and behave in a balanced manner.

11 Claims, 6 Drawing Sheets

(56) References Cited

U.S. PATENT DOCUMENTS

| | | | |
|---|---|---|---|
| 5,881,676 A * | 3/1999 | Brown et al. | 119/452 |
| 7,207,291 B1 | 4/2007 | Watts | |
| D654,230 S * | 2/2012 | Tedaldi et al. | D30/129 |
| D673,190 S * | 12/2012 | Klemm et al. | D15/90 |
| 8,534,225 B2 * | 9/2013 | Vermeegen | 119/51.5 |
| D698,095 S * | 1/2014 | Paculdo | D30/121 |
| 2006/0231039 A1 | 10/2006 | Abinanti et al. | |
| 2007/0107447 A1 * | 5/2007 | Langlotz | 62/66 |
| 2008/0053374 A1 | 3/2008 | Kerrigan et al. | |

* cited by examiner

TRAY FOR PRESENTING FOOD TO A PET

This application is a 371 filing of International Patent Application PCT/EP2011/051235 filed Jan. 28, 2011.

BACKGROUND

The present invention relates to a tray for presenting food to a pet. The tray comprises, seen in the use position, a topside, an underside and a peripheral side extending between the topside and the underside of the tray.

The term "pet" may in this disclosure include any animal, preferably an animal owned by a human. As example can be mentioned animals like dogs, cats and hamsters. The term includes however also wild animals held in captivity in e.g. a zoo.

Animals have followed the mankind since the beginning of time and many different types of devices for feeding the animals have been developed also during the years.

The object of these developments may have been to make it easy and convenient to feed the animals but also to get healthy and useful animals.

Generally is a pet kept of a human for companionship and amusement and the human owner therefore also have a natural interest in the welfare of the pet. The feeding of the pets is in this connection of great importance.

The food to be eaten of e.g. a dog is normally placed in a bowl-shaped dish in an amount necessary for that particular dog. The dog will, when being presented for the food in that way, owing to its nature swallow the food as quickly as possible. Such rapid consumption of food may however be detrimental for the dog, which afterwards often is belching, vomiting and releasing malodorous air from the stomach.

For avoiding such events, which are very unpleasant for both the dog and the owner of the dog, dishes are developed with different kinds of obstructions, which are arranged for motivating the dog to eat in a relatively slow pace.

Such an improved dish for feeding a pet is known from U.S. Pat. No. 7,207,291 B1. This dish is by means of radially extending ribs, which are formed on the bottom of the dish, divided up into a plurality of smaller sections disposing each only a fraction of the total meal to be eaten of the pet.

This improvement serves to limit the amount of food, which the pet has access to at a given time whereby the eating speed of the pet automatically is slowed down.

A draw back is however that pets of different kinds and sizes cannot use the same size of dishes so that it is necessary to market more sizes of such dishes resulting in heavy expenses to tools and production.

Another draw back consist in the fact that eating of the known dish doesn't stimulate the inherent nature of pets even though the eating process makes up an important part of the life of pets. The missing stimulation tends to cause the pets to be lazy or per contra aggressive and dangerous.

It therefore is important to stimulate the inherent nature of the pets. Such stimulation may take place in large mazes for pets. An example of such a maze is known from the U.S. Pat. No. 3,260,236. Said maze is arranged for leading a whole pet through the maze and the construction is therefore voluminous and costly and moreover complicated and the known maze cannot be utilized for food for pets since it is assembled by a number of different parts by means of joints in which food can hide and gradually taint.

SUMMARY OF THE INVENTION

The above-mentioned disadvantages of the prior art is according to the invention remedied by, in a first aspect of the invention providing a tray for presenting food to a pet and of the kind mentioned in the opening paragraph, which is stimulating the inherent nature of the pet, in a second aspect of the invention providing a tray for presenting food to a pet and of the kind mentioned in the opening paragraph, which in an advantageous way is motivating a pet for slowing down the speed of eating, in a third aspect of the invention providing a tray for presenting food to a pet and of the kind mentioned in the opening paragraph, which is arranged in such a way that a pet by eating of the tray will be more relaxed and behave in a balanced manner, in a fourth aspect of the invention providing a tray for presenting food to a pet and of the kind mentioned in the opening paragraph, which is adapted to force the pet to work for getting the food, in a fifth aspect of the invention providing a tray for presenting food to a pet and of the kind mentioned in the opening paragraph, which can be used of pets of different buildings and sizes, in a sixth aspect of the invention providing a tray for presenting food to a pet and of the kind mentioned in the opening paragraph, which is formed as a maze, in a seventh aspect of the invention providing a tray for presenting food to a pet and of the kind mentioned in the opening paragraph, which is hygienic in use and easy to clean, in an eight aspect of the invention providing a tray for presenting food to a pet and of the kind mentioned in the opening paragraph, which has a simple and inexpensive structure Other aspects of the invention will be apparent during the course of the following description.

The novel and unique wherein the above-mentioned features are achieved consists in the fact, that the topside of the tray partly is formed as a number of up-turned grooves and that at least some of these grooves are interconnected.

The term "groove" is used herein for a relatively narrow and elongated cavity having an opening at one side.

When pet food, preferably in the form of conventional dry pellets, is spread over the tray said food is placed in the up-turned grooves, and in order to eat the pet will have to retrieve the food from the grooves.

As the animal is retrieving said food the animal will not only be self-engaged during retrieval of the food, but the pet will also be rewarded as it retrieves food. The rate of retrieval will depend upon the degree of animal interaction with the tray but in any case the pet will be fed at a slower rate than hitherto known.

The tray according to the invention will therefore ensure that the natural needs of the animal are meet with respect to the use of brain, olfactory sense and feeding. The animal will hereby be more relaxed and behave in a balanced manner, because it can then use its energy, also when the pet is home alone.

In order to ensure that the animal only is able to retrieve the food with obstacles, at least some of the up-turned grooves may be formed in such a way that the pet can reach the bottom of the up-turned groove or alternatively close to the bottom of the up-turned groove, with its tongue and/or its feet but not with its teeth. The animal will therefore have to remove the food from the grooves and preferably from the tray, before the animal can eat the food.

The tray according to the invention will therefore provoke a continued and independent animal interest, as the animal continually is interested in being fed, and the tray will therefore not as conventional animal "toys" be disregarded after a period of use.

In a preferably embodiment the grooves are dimensioned such that both larger and smaller pets can use the same tray according the invention. This is preferably achieved if at least some of the side faces of the up-turned grooves are converging into a direction towards the underside of the tray. Larger pets are therefore prevented from reaching the bottom of the tray at a higher level in the tray than smaller pets, simply due to the larger head of the larger animal, but since the grooves are converging both large and small animals will receive the necessary stimulating during the retrieval of the food.

It therefore is not necessary to market several different sizes of the tray according to the invention whereby large expenses to tools and production is saved.

The above-mentioned converging shape of the interconnected grooves of the invention contributes in forming obstructions that inevitably will force a pet to display a large amount of energy to retrieve/get hold of the food. This is due to the fact that the animal mainly is able to contact the food with it's tongue and feet and thereby move the food along, or upwards in the grooves for trying to bring the food outside the tray where the pet can use its teeth and accordingly eat the food.

Thus, the effort which the pet need to display for retrieving the desired food will advantageously stimulate the inherent nature of the pet and will thereby raise the spirit of the pet preventing it from being lazy or perhaps aggressive and dangerous for the surroundings.

Retrieving the food further forces the pet to move around during eating keeping the pet in good condition and health. Furthermore, the arrangement of the tray according to the invention will simultaneously ensure that the pet will eat in a relatively slow tempo preventing it from being affected by disagreeable inconveniences such as belching, vomiting and releasing malodorous air from the stomach, which inconveniences also are disagreeable for the pet's owner.

In order to provide an advantageously tray the grooves can each have a quadratic or rectangular shape rounded at the corners, thereby preventing that some of the food sticks in the grooves or along a path, when the pet tries to displace the food along the grooves. This feature is especially relevant in cases where the pet is left alone ensuring that the pet always is able to retrieve the food from the tray.

The grooves and/or the complete tray can further be coated/covered with a material having a low coefficient of friction in order to ensure that the food easily can be displaced. However, in some embodiments the tray and/or grooves can be coated or covered with materials having different coefficient of friction providing different levels of interaction with the food.

For stimulating the inherent nature of the pet the grooves can be arranged in such way that they appeal and improve the intelligence of the pet.

The interconnected grooves can in one embodiment according to the invention form at least one path along which the pet with its tongue or feet can try to scrape the food towards a way out of the tray. The tray can comprise one or more paths arranged for providing various "difficulties" of the tray.

In a preferred embodiment according to the invention the path of grooves in the tray forms a maze increasing the complexity factor for the pet so that the pet now need to work harder for getting hold of the food but at the same time also is very much stimulated by exercising such increased activity.

Simultaneously or alternatively the tray according to the invention can also comprise one or more grooves, which is debouching into the outer side of the tray ensuring that the pet eventually will be able to move the food outside the tray where it can catch and eat the food. In a similar why the grooves can comprise openings such that the food can be displaced between grooves.

In one embodiment of the tray according top the invention can the tray be connected to or be integral with a dish formed along at least a part of the peripheral side of the tray so that the pet in a hygienic way can eat of that dish instead of the floor.

In one embodiment the bottom of an up-turned groove can be sloping upwards to the upper side of the tray at the outer side of this so that the pet need to push the food uphill to catch hold of the food. Said embodiment comprises a different level of "difficulty" for the animal when eating from the tray according to the invention.

According to the invention said activity or difficulty can further be increased by forming more path of interconnected grooves in the tray so that the pet then need to make experiments for finding a way among more possibilities for getting food out of the maze.

Performing such experiments will advantageously also improve the intelligence of the pet to the benefit for both the pet and the owner of the pet.

It will be understood that the tray according to the invention can comprise one or more other kinds of optical for changing or altering the level of interaction between the animal and the tray. As an example can be mentioned that one or more grooves can comprise a rib and/or a number of pins in order to reduce the bottom dimensions of the groove, preventing smaller animals from retrieving the food easily. The rib and/or pin can preferably be made interchangeable or removable attached to the bottom of the grooves by any convenient attachment means. Such means are well known to the person skilled in the art and will not be discussed in further details.

This can e.g. be of interest if two animals, one small and one large, are sharing one tray, as part of the tray can incorporate rib s designed for the smaller an animal and the other part can lacking said rib s. The tray can according also comprise grooves having different dimensions from the beginning or comprise different obstacles or play objects, e.g. for providing sounds when the animal is almost at an opening into the surroundings.

The tray can in one embodiment according to the invention be equipped with only up-turned grooves extending down into the tray from the topside, i.e. the grooves are opened at the upper side of the tray.

In another embodiment according to the invention the underside of the tray can however partly be formed as a number of down-turned grooves which are connected to each other whereby the top- and underside of the tray can be separated by a common wall which all over has the same thickness so that a light and cheap tray is obtained.

When the up- and down-turned grooves are converging into opposite directions the bottom side will be complementary to the topside ensuring that more trays advantageously can be stacked on top of each other. Several trays will therefore require less storage space in said embodiment and accordingly lower transportation costs will be incurred.

In an advantageous embodiment according to the invention the tray can be formed as an integral unit without joints in which food could hide and gradually taint. The tray then will be hygienic in use and easy to clean.

The tray is preferably made from a material easy to clean, e.g. a hard plastic however other kinds of material are contemplated within the scope of the invention. In a preferred embodiment the tray is made from a partly transparent practice, providing an especially pleasant esthetic appearance.

When the tray according top the invention is equipped with a dish extending along the peripheral side of the tray the tray and the dish can together be formed as an integral unit, preferably via vacuum formation or plastic moulded.

BRIEF DESCRIPTION OF THE DRAWINGS

The invention will be explained in greater details below where further advantageous properties and example embodiments are described with reference to the drawings in which.

DETAILED DESCRIPTION OF THE INVENTION

In the following is assumed that the pet, which is intended to eat of the tray of the invention, is a dog and that the feet of the pet is the paws of the dog.

Figure 1:
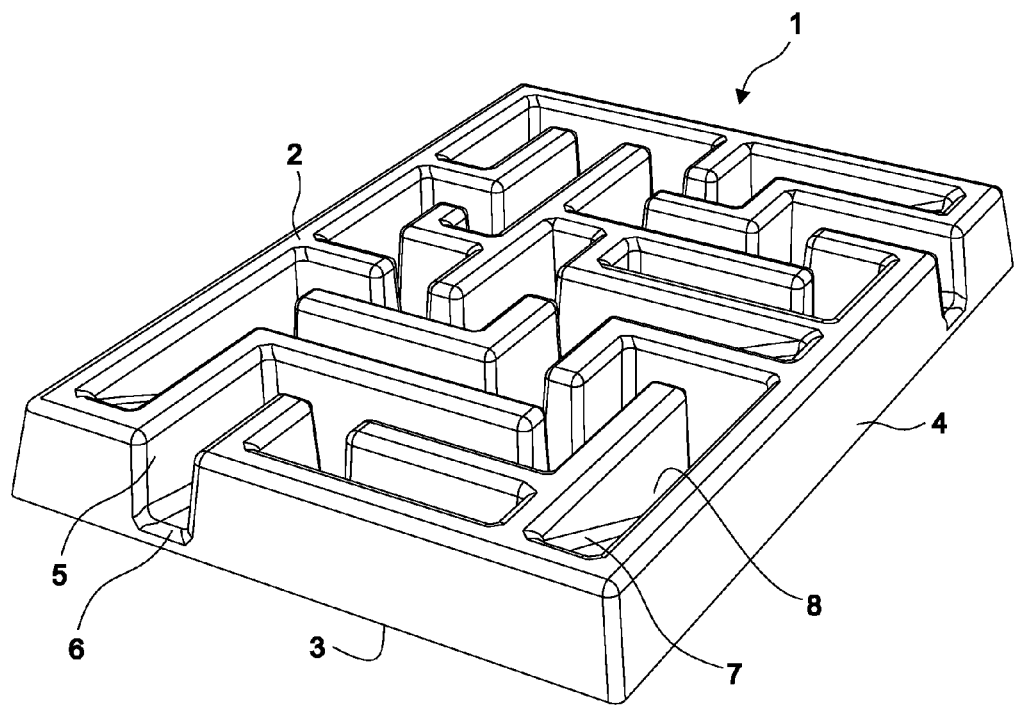
FIG. 1 shows, seen in perspective, a tray for presenting food to a pet in an embodiment formed as a maze.

FIG. 1 shows an embodiment of a tray 1 according to the invention, which is arranged for presenting food for the dog, preferably dry food in the form of pellets, in a very special way, which in the following will be explained in greater details.

The tray 1 comprises a topside 2, an underside 3 and a peripheral side 4. The underside 3 cannot be seen in FIG. 1.

The topside 2 of the tray is partly formed as a number of interconnected up-turned grooves 5, which form a number of paths in the tray. The number of paths can within the scope of the invention be selected arbitrarily and according to the desired level of difficulty, e.g. can the number of path be one, five or ten.

In the embodiment shown in FIG. 1 the complete surface is formed as up-turned grooves, however it is contemplated that part of the topside can be free for grooves or that part of the topside forms one or more bowls or cups for presenting e.g. drinking water or food, which accordingly can be reached more easily for the dog.

The number of different path will however in combination with one or more obstacles force the dog to work hard in order to retrieve the food, e.g. by pushing the food outside the tray, so that the food easily can be eaten, thereby stimulating the dog in a very convenient and easy manner.

Several paths trough the tray also will divide the food into smaller portions, such that the dog cannot push all food outside the tray in one action and in an unhealthy way swallow all the food in a hurry.

The paths of grooves, shown in FIG. 1, will together form a pattern like a maze, but the tray is so low and the grooves so narrow that the dog is not able to walk along the paths of the grooves as in a real maze. The dog can partly enter the grooves and reach the bottom of the grooves but only with the tongue and/or paws.

Some of the paths of interconnected grooves are closed at one end while other paths are communicating with the surroundings via openings 6 in the peripheral side 4 of the tray or by means of upwards sloping bottom faces 7 of a groove 8, which helps the dog during the displacement of the food to the outside the tray.

Figure 2:
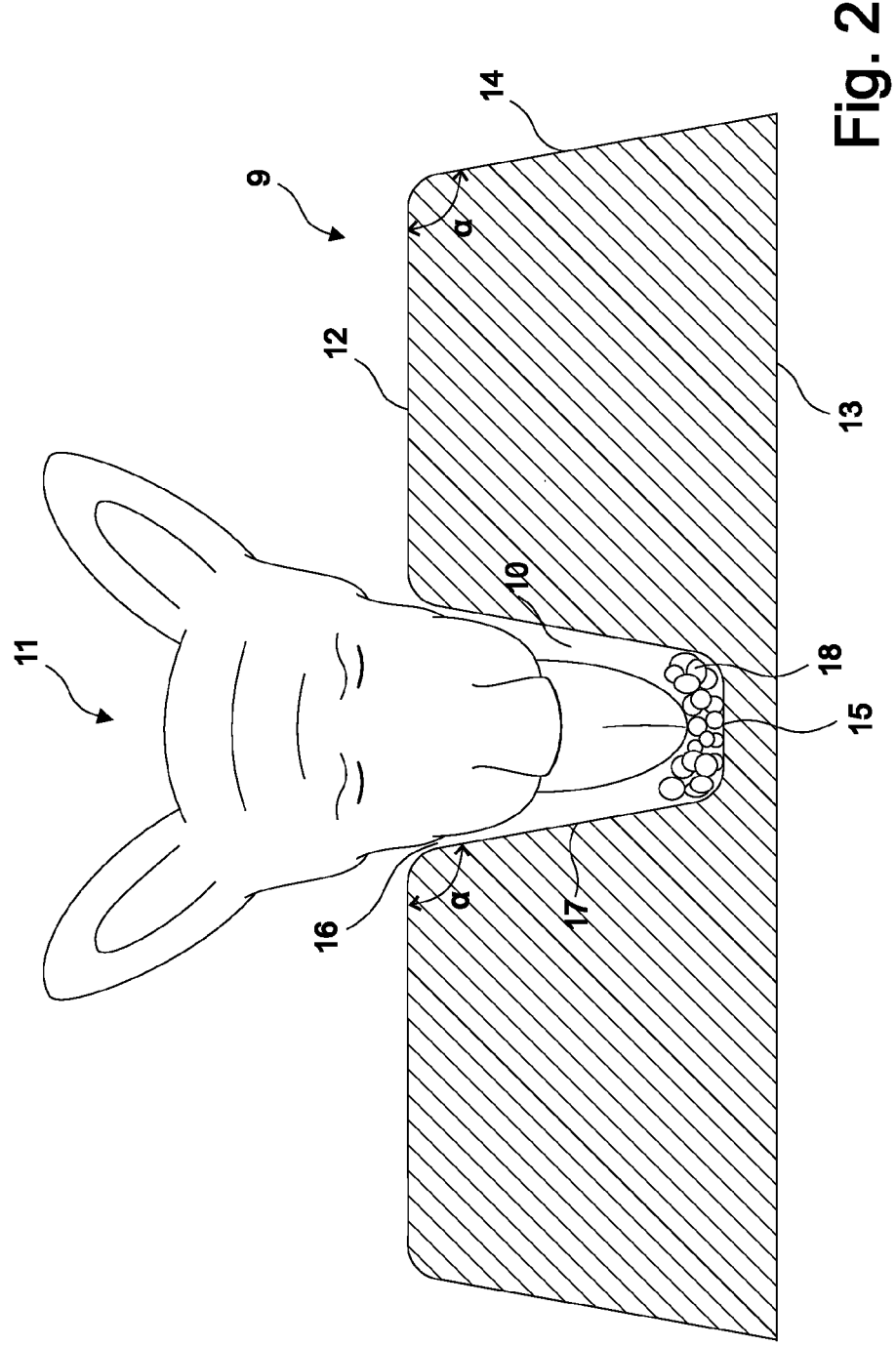
FIG. 2 shows, seen in cross section, another embodiment of a tray for presenting food to a pet and the pet eating of the tray.

FIG. 2 shows a cross section of a simple embodiment of a tray 9 according to the invention. In this case the tray has only one groove 10, which partly is entered by a dog of which only the head 11 schematically is seen.

The tray 9 has topside 12, an underside 13 and a peripheral side 14. The topside and bottom side of the tray extend in this embodiment parallel with each other, but may in other embodiments within the scope of the invention form an angle with each other.

The underside of the tray is in the embodiment plane while a part of the topside is descending into a groove 10 with a bottom 15, an opening 16 and opposite sides 17 extending between the bottom and the opening of the groove.

Each of the opposite sides 17 of the groove 10 form an angle α with the topside 12 of the tray and the groove is moreover so narrow that the dog is only able to reach to or close to the bottom of the up-turned groove with its tongue and/or its paws but not with its teeth.

That feature implies that the dog cannot, or at least only hardly, catch hold of the food 18 and the dog therefore need to push the food outside the tray via the openings 6 or the sloping bottom faces 7, by means of tongue and paws for being able to use its teeth and eat the food.

The transitions between the topside 12 and each of the sides 17 of the groove 10 are rounded and the transitions between each of the sides 17 and the bottom 15 of the groove are likewise rounded so that the tray becomes comfortable for the dog to use and hygienic and easy to clean.

The peripheral side of the tray moreover forms the same angle α with the topside 12 of the tray as the opposite sides 17 of the groove 10, whereby the tray in its entity achieve a harmonious and aesthetic appearance.

Experiments has proven that the best result of presenting food to dogs having several different sizes and without comprising the level of difficulty and activity level for the dog is obtained when, the length of the tray is between 500 mm and 700 mm,
the width of the tray is between 300 mm and 500 mm,
the thickness of the tray is between 40 mm and 60 mm,
the width of the groove at the bottom of the groove is between 15 mm and 30 mm, and
the angle α between each of the opposite sides of the groove and the topside of the tray is between 5° and 15°.

The number of path can vary depending on the desired difficulty level and indented use.

The embodiment of the tray shown in FIG. 2 is suitable for being made by e.g. plastic moulding of a light cellular plastic coated with rubber having a low coefficient of friction.

Figure 3:
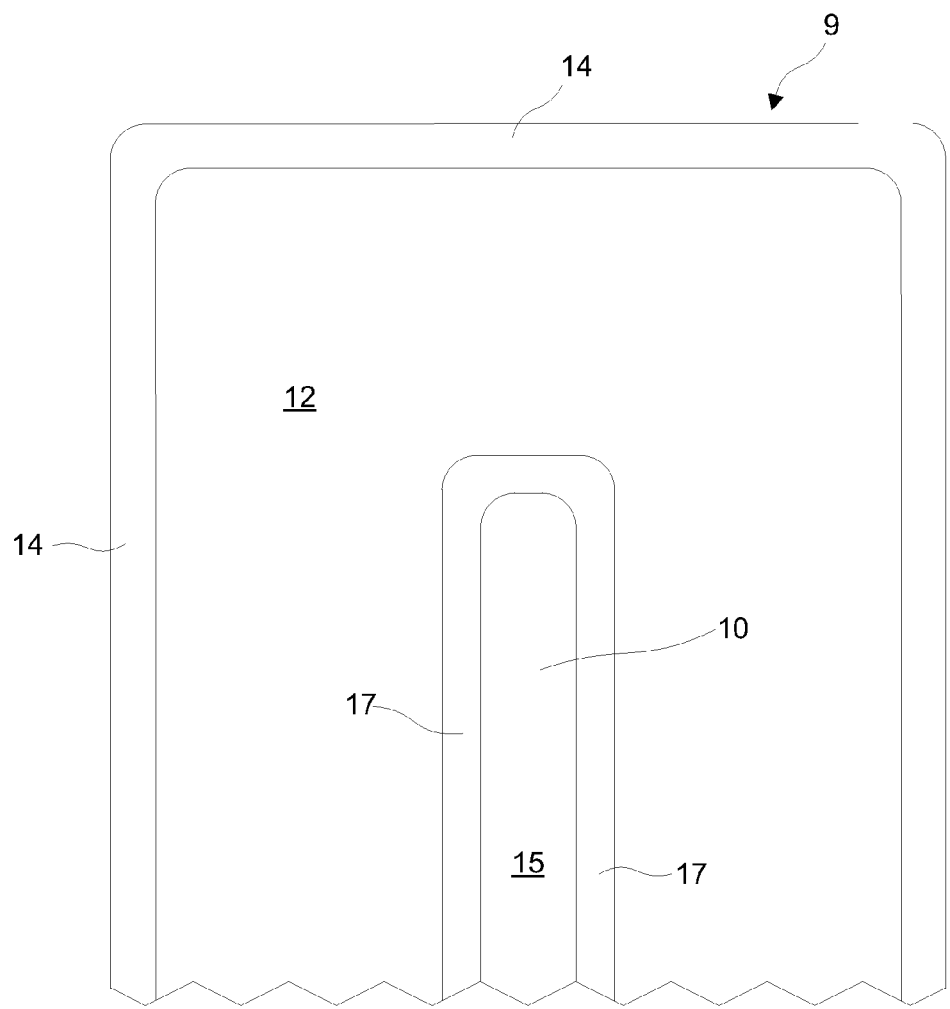
FIG. 3 shows, seen from above, a fragment of the tray seen in FIG. 2.

FIG. 3 shows, seen from above, a fragment of the tray seen in FIG. 2. In this case the groove 10 is closed at one end.

The groove shown in FIG. 3 has a mainly a rectangular shape and the same is the case with the interconnected grooves of the tray shown in FIG. 1. This shape of the grooves advantageously eliminates the risk of that the dog starves because the food tends to stick in the grooves when the pet tries to displace the food along the grooves.

Figure 4:
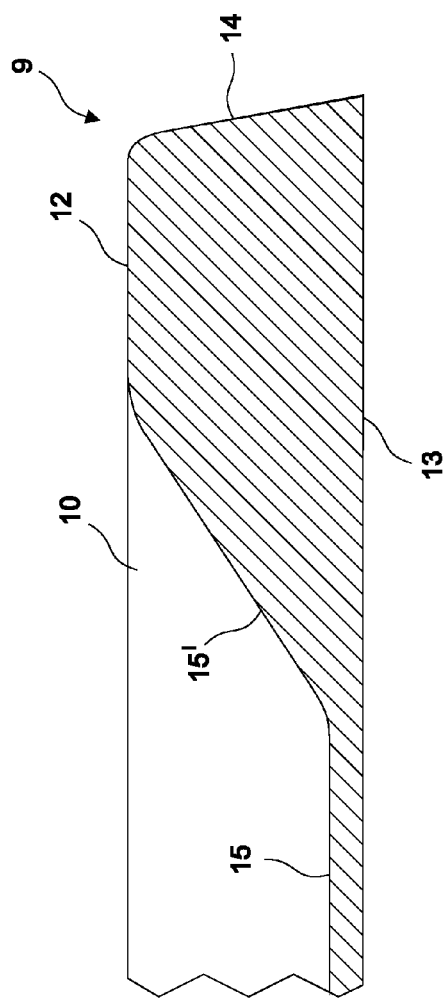
FIG. 4 shows a fragment of a longitudinal section of a variant of the tray seen in FIG. 2.

FIG. 4 shows a fragment of a longitudinal section of the tray seen FIG. 2, but in a variant where a section 15' of the bottom 15 of the groove 10 is sloping upwards to the topside 12 of the tray at the outer side of this. By means of this construction of the groove can the dog push food uphill and via the topside out to an area outside the tray, e.g. a floor.

Figure 5:
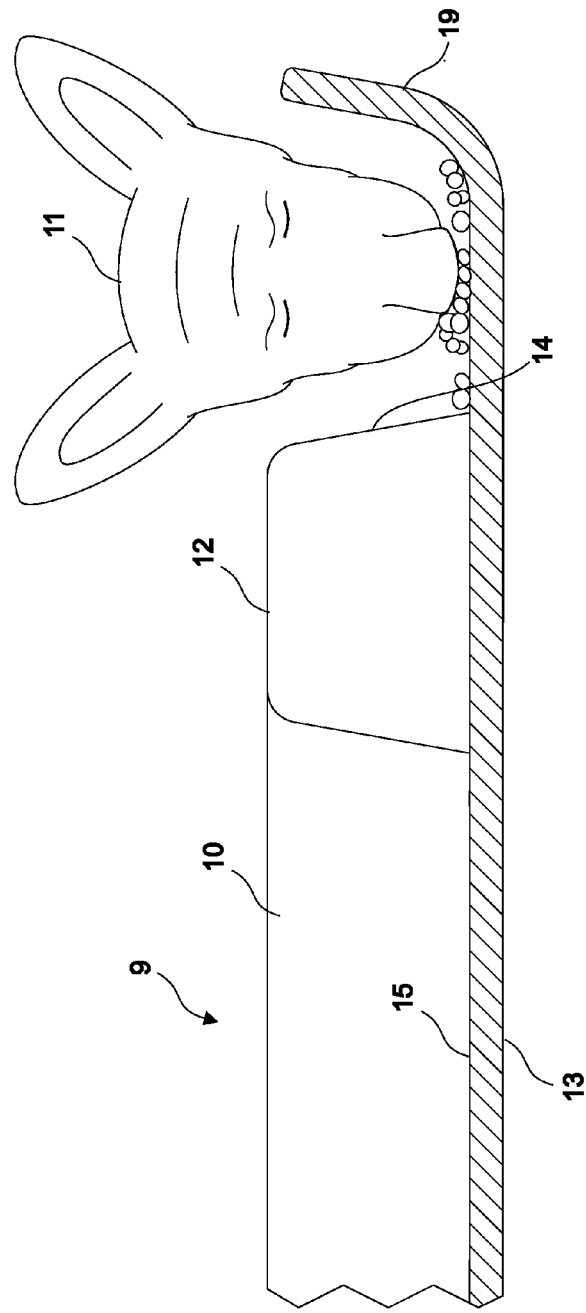
FIG. 5 shows a fragment of a longitudinal section of another variant of the tray seen in FIG. 2 and the pet eating of the tray.

FIG. 5 shows a fragment of a longitudinal section of the tray seen FIG. 2, but in a second variant. In this case is the groove 15 extending straight through the tray to a dish 19 on the outside of the tray.

This dish 19 is at least extending along those parts of the outer side of the tray where the grooves have an opening to the free or an upwards-sloping bottom. But it is preferred that the dish extends along the total periphery of the tray and that the dish moreover is integral with the tray.

In FIG. 5 is the dog 11 eating of the dish instead of the floor, which therefore advantageously will not become dirty by the displaced food.

Figure 6:
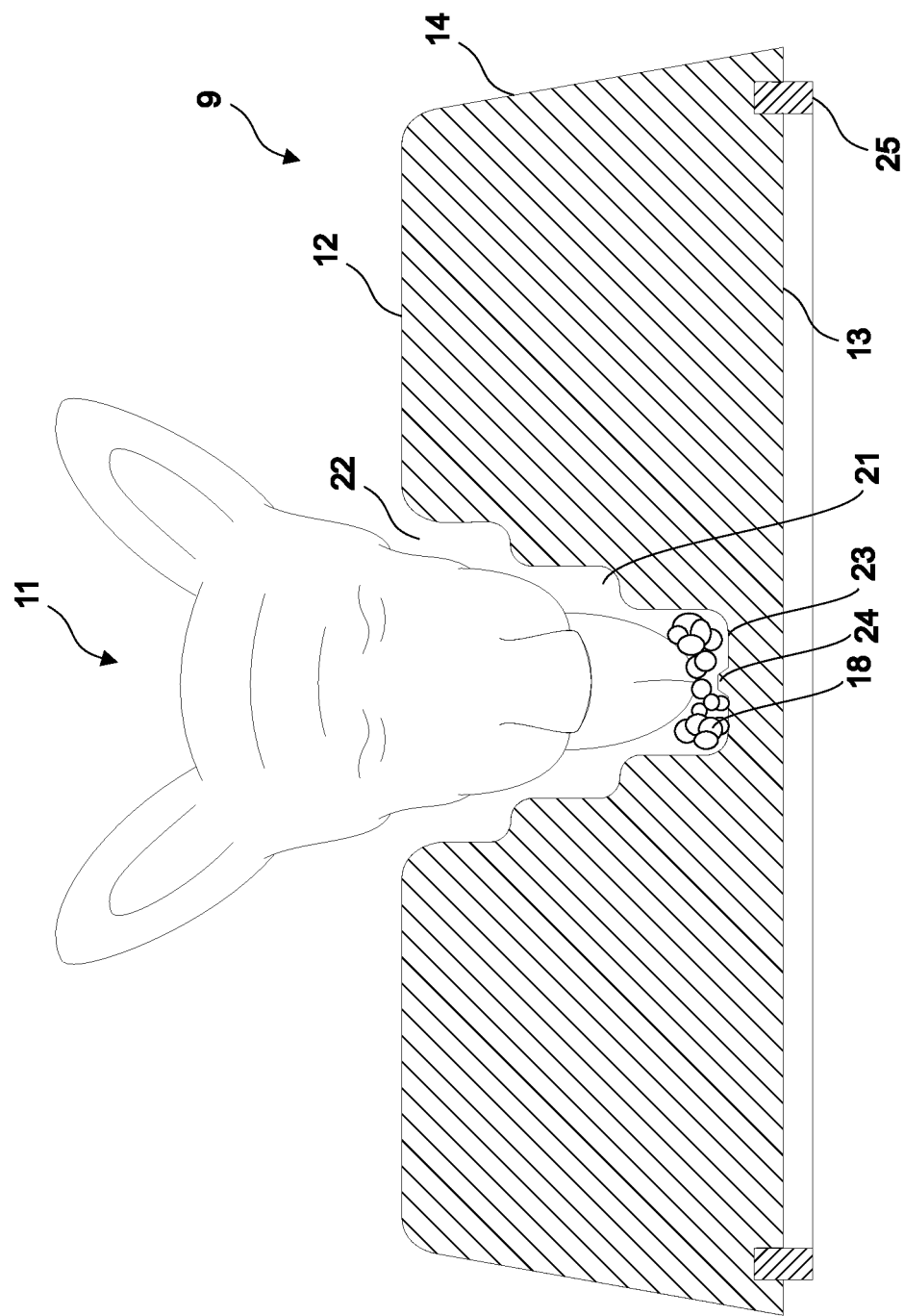
FIG. 6 shows, seen in cross section, another embodiment of a tray for presenting food to a pet and the pet eating of the tray.

FIG. 6 shows a cross section of an expedient variant of the tray shown in FIG. 2. The sides 20 of the groove 21 are in this case made step-formed in such a way that the width of the groove is increased at the opening 22 and decreased at the bottom 23.

This shape of the groove is very comfortable for the dog using the tray since the dog is allowed freedom of movement in most of the groove except in the lower part where the food will be placed. This lower part of the groove therefore forms the same obstruction for the dog trying to get hold of the food as previously mentioned by referring to FIG. 2.

On the bottom 23 of the groove 21 is furthermore formed a longitudinally extending rib 24 which motivates the dog to push the food along the groove instead of across the groove.

A list of e.g. rubber is in FIG. 6 moreover let into the underside of the tray 9 for hindering that the tray slides along e.g. the floor when being acted upon by the dog which eagerly is trying to get hold in some food in the tray.

Figure 7:
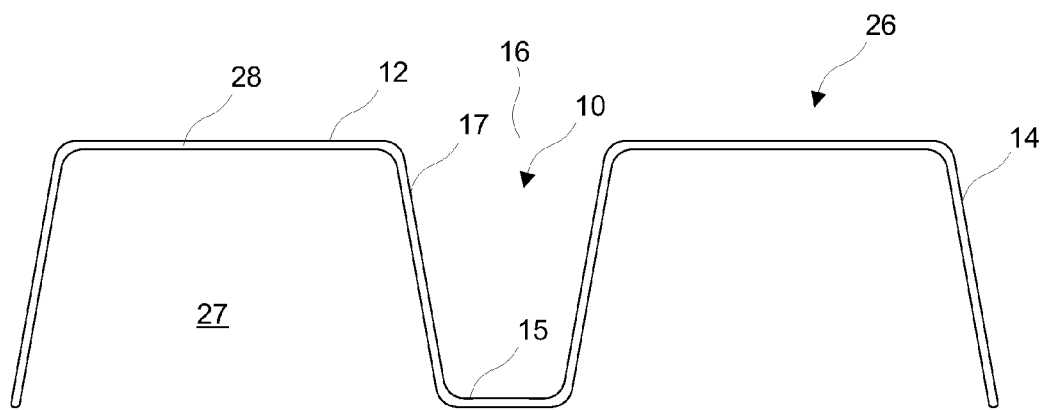
FIG. 7 shows, seen in cross section, a third embodiment of a tray for presenting food to a pet.

FIG. 7 shows a variant 26, seen in cross section, of the tray shown in FIG. 2 equipped also with down-turned grooves 27 so that a wall 28, which all over has at least nearly the same thickness, is separating the top- and underside of the tray.

The tray of this variant is suitable for being vacuum formed of a plastic sheet having a thickness of between 2-4 mm. The tray can however also be made of enamelled iron or ceramics.

Figure 8:
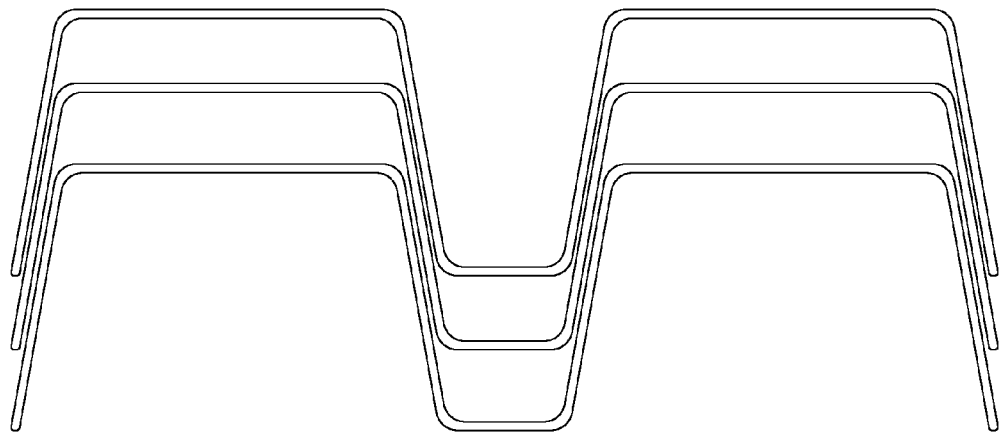
FIG. 8 shows three of the trays shown in FIG. 8 stacked on top of each other.

The up- and down-turned grooves of the tray shown in FIG. 7 are converging into opposite directions whereby more trays, as seen in FIG. 8, can be stacked on top of each other causing that the trays are occupying only little space during storing and transporting.

The tray is described above and shown in the drawing as having a quadratic or rectangular shape. Within the scope of the invention can the tray have many other shapes, such as e.g. a triangle, an ellipse, a super-ellipse or a circle.

What is claimed is:

1. A pet feeding dish for presenting food to a pet and which, seen in the position of use, is a tray which comprises a top side, an outer side, an underside and a peripheral side extending between the top side and the underside of the tray, wherein the top side is partly formed as a number of up-turned grooves, with at least one groove including an opening to the outer side of the tray and at least a part of a bottom face of a groove having an upward slope that is directed towards the top side of the tray, wherein a maze is provided by at least some of the grooves being interconnected, with the maze defining at least one path along and though the interconnected grooves, and wherein the up-turned grooves have bottoms, side faces, and heights, and are spaced from adjacent grooves, with the groove heights and spacing configured and dimensioned such that the pet can reach to or close to the bottom of the up-turned grooves to move the food along the path to the opening or along the upward sloped bottom face with its tongue or its feet but not with its teeth so as to access the food for consumption.

2. The tray according to claim 1, wherein the side faces of at least some of the up-turned grooves converge into a direction towards the underside of the tray.

3. The tray according to claim 1, wherein at least a part of the bottom of additional up-turned grooves of the tray slopes upwards.

4. The tray according to claim 1, which is connected to an additional dish formed along at least part of the peripheral side of the tray.

5. The tray according to claim 1, wherein the underside of the tray is also partly formed as a number of up-turned grooves with at least some of the grooves being interconnected.

6. The tray according to claim 1, wherein the top side and underside of the tray are separated by a common wall which over all has the same thickness.

7. The tray according to claim 1, which is formed as an integral unit.

8. A method for stimulating or motivating a pet or animal which comprises adding pet food to some or all of the grooves of the pet feeding dish according to claim 1 and feeding the pet or animal from the tray.

9. A method of manufacturing a pet feeding dish according to claim 1, which comprises forming the tray by vacuum forming or plastic moulding.

10. A pet feeding dish for presenting food to a pet and which, seen in the position of use, is a tray which comprises a top side, an outer side, an underside and a peripheral side extending between the top side and the underside of the tray, wherein the top side is partly formed as a number of up-turned grooves, with at least one groove including an opening to the outer side of the tray and at least a part of a bottom face of a groove having an upward slope that is directed towards the top side of the tray, wherein a maze is provided by at least some of the grooves being interconnected with at least one adjacent groove, with the maze defining at least one path along and though the interconnected grooves, and wherein the up-turned grooves have bottoms, side faces, and heights, and are spaced from adjacent grooves, with the groove heights and spacings configured and dimensioned such that the pet can reach to or close to the bottom of the up-turned grooves with its tongue or its feet but not with its teeth to move the food along the path to the opening or along the upward sloped bottom face with its tongue or its feet but not with its teeth so as to access the food for consumption, wherein the up-turned grooves have a substantially uniform width.

11. A pet feeding dish for presenting food to a pet and which, seen in the position of use, is a tray which comprises a top side, an outer side, an underside and a peripheral side extending between the topside and the underside of the tray, wherein the top side is partly formed as a number of up-turned grooves, with at least one groove including an opening to the outer side of the tray and at least a part of a bottom face of a groove having an upward slope that is directed towards the top side of the tray, with each groove interconnected with at least one adjacent groove, wherein each of the up-turned grooves has a substantial uniform width, and a maze is provided by at least some of the grooves being interconnected with at least one adjacent groove, with the maze defining at least one path along and though the interconnected grooves, such that the pet can move the food along the path to the opening or along the upward sloped bottom face with its tongue or its feet but not with its teeth so as to access the food for consumption.

* * * * *